United States Patent
Sen et al.

(10) Patent No.: US 7,882,366 B2
(45) Date of Patent: Feb. 1, 2011

(54) STORAGE MEDIA TRACKING AND MANAGMENT

(75) Inventors: Vijay Sen, Hyderabad (IN); Karandeep Singh Anand, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 847 days.

(21) Appl. No.: 11/735,716

(22) Filed: Apr. 16, 2007

(65) Prior Publication Data

US 2008/0256110 A1     Oct. 16, 2008

(51) Int. Cl.
*G06F 11/30* (2006.01)

(52) U.S. Cl. .................. 713/193; 707/654; 707/769; 726/26; 711/165

(58) Field of Classification Search .......... None
See application file for complete search history.

(56) References Cited

U.S. PATENT DOCUMENTS

| | | | |
|---|---|---|---|
| 5,721,655 | A | 2/1998 | Thweatt |
| 5,765,173 | A | 6/1998 | Cane et al. |
| 5,940,854 | A | 8/1999 | Green et al. |
| 5,963,134 | A | 10/1999 | Bowers et al. |
| 5,963,971 | A | 10/1999 | Fosler et al. |
| 6,266,211 | B1 | 7/2001 | Thomas, III et al. |
| 7,042,358 | B2 | 5/2006 | Moore |
| 2003/0083948 | A1 | 5/2003 | Rodriguez et al. |
| 2005/0071234 | A1 | 3/2005 | Schon |
| 2005/0258956 | A1 | 11/2005 | Neuwirth |
| 2006/0053088 | A1 | 3/2006 | Ali et al. |
| 2007/0018820 | A1 | 1/2007 | Chand et al. |
| 2007/0162359 | A1* | 7/2007 | Gokhale et al. ............ 705/28 |
| 2008/0253746 | A1 | 10/2008 | Wood |

OTHER PUBLICATIONS

Thomas, Fred, Penny Tag Technologies for Removable Data Storage, Research Feature, http://ieeexplore.ieee.org/iel5/2/27423/01220584.pdf?isNumber=, vol. 36, Issue 8, Aug. 2003, 7 pages, IEEE Computer Society, USA.

Author Unknown, AeroScout Visibility System: Bridging the Gap between Wi-Fi, Active RFID and Telemetry, AeroScout Visibility Solutions, http://www.aeroscout.com/content.asp?page=SystemOverview, printed Feb. 22, 2007, 3 pages, USA.

(Continued)

*Primary Examiner*—Nasser Moazzami
*Assistant Examiner*—Fikremariam Yalew
(74) *Attorney, Agent, or Firm*—Senniger Powers LLP

(57) ABSTRACT

Managing removable computer-readable media transporting across various locations. Data is stored on the computer-readable media at an on-site location. Each of the computer-readable media is associated with a tracking device. The tracking device has a storage medium. An intent expression is defined for each of the computer-readable media. The defined intent expression includes conditions for managing each of the computer-readable media. The defined intent expression for each of the computer-readable media is stored on the storage medium of the tracking device. The computer-readable media are transported from the on-site location to an offsite location. The stored intent expression is obtained for each of the computer-readable media on the tracking device at the offsite location to manage the computer-readable media based on the defined intent expression.

20 Claims, 3 Drawing Sheets

OTHER PUBLICATIONS

Ma, Hongshen et al, The FindIT Flashlight: Responsive Tagging Based on Optically Triggered Microprocessor Wakeup, http://www.media.mit.edu/resenv/pubs/papers/2002-10-UbiComp-FindIT.pdf, presented at the UbiComp 2002 Conference Sep. 29-Oct. 1, 2002, 8 pages, USA.

Datta, Shoumen, R F I D . . . an incomplete story, http://scholar.google.com/scholar?hl=en&lr=&newwindow=1&q=cache:_1asxxpTPBIJ:supplychain.mit.edu/innovation/docs/RFID_an%2520incomplete%2520story.pdf+, 2001, 66 pages, USA.

* cited by examiner

STORAGE MEDIA TRACKING AND MANAGMENT

BACKGROUND

With ease of usability and applicability of computers or computing devices in modern daily life, governmental or non-governmental entities constantly store information on computer-readable media. In addition, due to various business or legal considerations or requirements, information that has been stored is constantly been backed-up or preserved on a regular, such as daily or weekly, basis to removable or computer-readable media. These removable backup computer-readable media are not accessed on a regular basis, but the information stored therein may not be destroyed for various reasons, such as legal, internal auditing, or other reasons. Although new technologies have continuously increased storage capacity of each unit of these removable computer-readable media, while reducing the size of the unit, the need for physical locations to house these units continue to be a logistic concern.

It would be optimal for each entity (e.g., government or non-government entity) to store all units of the computer-readable media in one location, such as the corporate headquarter, where each unit can be set aside or can be accessed at one's convenience. However, it may be impossible for an enterprise to house all information or data in one location. As such, these removable computer-readable media are transported to offsite locations, and tracking or labeling of each unit becomes necessary.

For example, current tracking or labeling practices include affixing a bar code label to identify each unit of the removable computer-readable medium. A list includes information that associates each bar code with a description of data stored in the removable computer-readable medium unit. When a shipment of removable computer-readable medium units arrive at an offsite location (e.g., a warehouse), a user uses a bar code reader to read the bar code and the user compares the read bar code with the information on the list to confirm that the proper removable computer-readable medium units have arrived. The removable computer-readable medium units next may be shelved according to a desirable cataloging or indexing scheme. When it is time to return the computer-readable medium unit or destroy data on the computer-readable medium unit, the user would retrieve the removable computer-readable medium unit from the shelf and perform the necessary operations.

The existing practices and techniques, while accomplish the purpose of tracking and labeling computer-readable medium units, fail to permit rich information needed in managing computer-readable media. In addition, current practices continue to rely on various manual and laborious activities and are inefficient. Even if some automated processes are used, the information about each computer-readable medium unit needs to be updated from time to time by a human operator.

SUMMARY

Embodiments of the invention improve upon current practices by managing removable computer-readable media based on intent-based information that is readily available on each removable computer-readable medium unit. Aspects of the invention optimized tracking and managing of removable computer-readable medium units by encoding intent-based expressions that provide rich information for managing the computer-readable media and the data stored thereon. Benefits of embodiments of the invention provide efficient access, audit and inventory of removable computer-readable media.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Embodiments of the invention improve existing managing, including tracking and handling, of removable computer-readable media by embedding rich intent expressions to tracking devices associated with the removable computer-readable media. Aspects of the invention provide means for convenient and efficient management of the removable computer-readable media and data stored on the computer-readable media without a need to access the removable computer-readable media.

Figure 1:
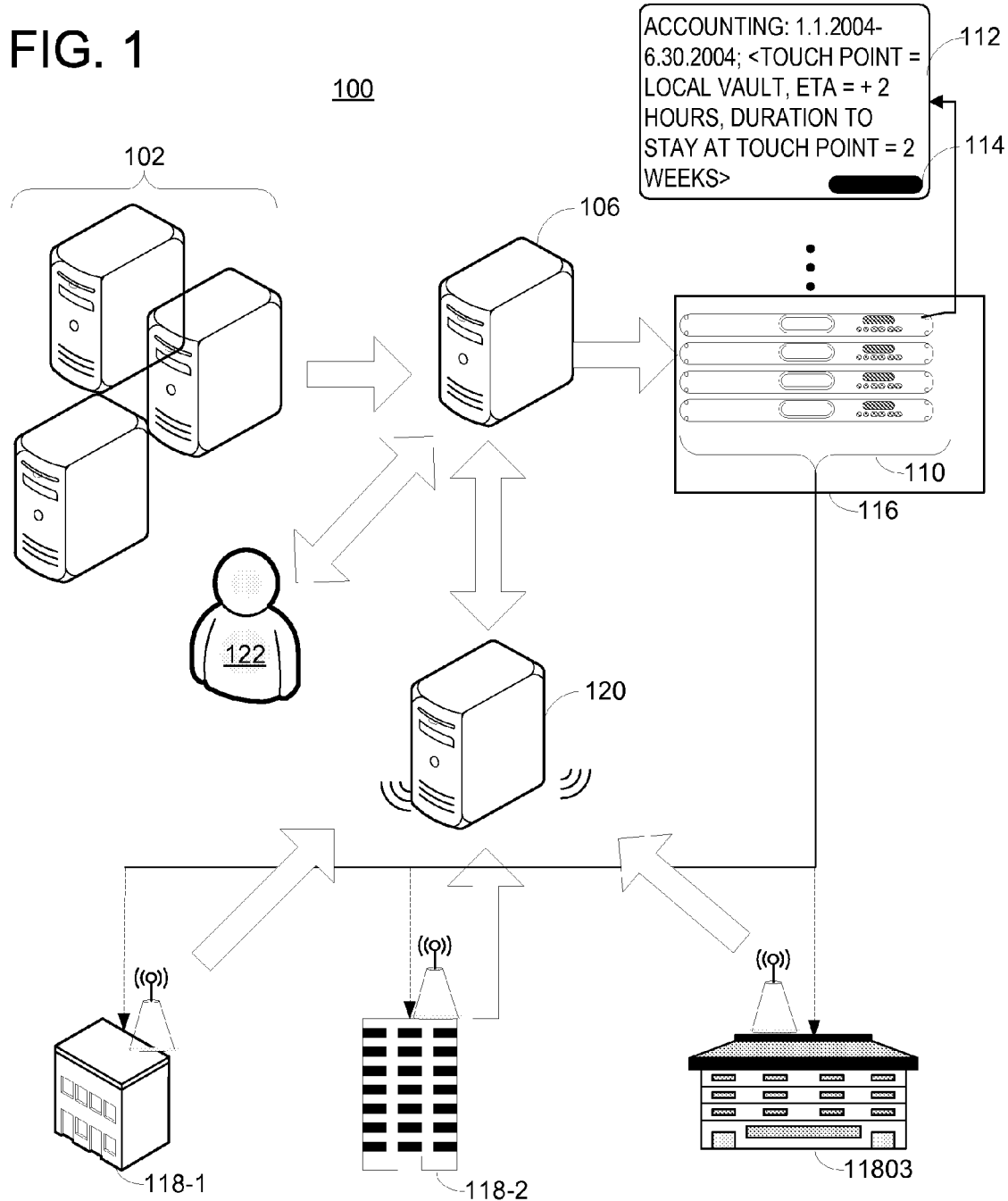
FIG. 1 is an exemplary block diagram illustrating a system for tracking and managing removable computer-readable media according to an embodiment of the invention.

Referring now to FIG. 1, a block diagram illustrates a system 100 for tracking and managing removable computer-readable media according to an embodiment of the invention. In one embodiment, the system 100 includes a cluster of servers 102 providing data to be preserved or backed-up. For example, the cluster of servers 102 includes a web service server, an authentication server, a database server, a file server, or other types of servers. In another embodiment, the cluster of servers 102 may also include one or more workstations providing services to other computers or computing devices.

The cluster of servers 102 provides the data to a data protection server or first server 106 to be preserved. For example, the file server of the cluster of servers 102 for an accounting department transfers accounting data (e.g., account receivable, invoices, etc.) via a communications network (e.g., an internet or an intranet) to the data protection server 106. In one example, the data protection server 106 includes one or more computer-executable components, applications, software programs, or a combination thereof. In another embodiment, the data protection server 106 creates shadow copies of data received from the cluster of servers 102.

The data protection server 106 stores the backup or shadow copy data on one or more computer-readable media 110 for storage. For example, computer-readable media include removable/non-removable, volatile/nonvolatile computer storage media. In another example, the computer-readable media 110 may include a magnetic disk drive, a tape drive, an optical disk drive, magnetic tape cassettes, flash memory cards, digital versatile disks, digital video tape, solid state RAM, solid state ROM, and the like. It is to be understood that other types of computer-readable media may be used without departing from the scope of the invention.

In one embodiment, the computer-readable media 110 include a complete and exact copy of data from the cluster of servers 102. In another embodiment, the data protection server 106 may store a portion of the data to be backed-up in one computer-readable medium 110, while the remaining portion of the data in a second computer-readable medium 110. For example, the data protection server 106 may be a server that saves a shadow copy of original data on a computer-readable medium and any updates to the shadow copy on another computer-readable medium such that the computer-readable medium stores the data in the "difference area (diff-area)."

In addition to storing data to the computer-readable media 110, the data protection server 106 also defines an intent expression 112 for each computer-readable medium 110. For example, each of the computer-readable media 110 is associated with a tracking device 114, such as a radio frequency identification (RFID) tag, global satellite positioning (GPS) device, or other tracking devices having a data storage medium. The data protection server 106 stores or writes the intent expression 112 on the data storage medium (which is a writable storage medium) of the tracking device. For example, the intent expression 112 may include at least identification information and a description of the data stored on the computer-readable media 110. In another embodiment, the intent expression 112 is part of an intent-based data management/protection system in which the intent expression 112 includes or is part of intent-based policies. For example, the intent policies may include a set of rules for managing shadow copies of data, backup data, or other types of data. The intent expression 112 may be expressed in the same format and or syntax as the intent policies.

In an alternative embodiment, the intent expression 112 may be incorporated with or a part of role/persona-based access privilege system. For example, within an user access group or class, a user under a given role or position may be given certain access rights (e.g., an administrator) while another group of users may be given less access privileges (e.g., a guest user). In this embodiment, aspects of the invention incorporate the intent expression 112 with the access privileges/rights system such that some groups with rights to create, delete, modify or update the intent expression 112 are defined to ensure security of the intent expression 112. Other groups may be given privileges/rights to read the intent expression 112 or receive notification of the events as the intent expression 112 is processed.

In one example, the computer-readable media 110 are transported from an onsite location 116 to an offsite location 118. For example, the computer-readable media 110 may originally be housed in a server room or data storage facility at the onsite location 116. Once the data protection server 106 has completed storing or writing the data on the computer-readable media 110, the computer-readable media 110 may be transported or relocated to the offsite location 118. The offsite location 118 (e.g., offsite locations 118-1, 118-2, and 118-3) may be a vault or storage room in the same building as the onsite location 116 or may be a location at a close vicinity of the onsite location 116 or remote with respect to the onsite location 116, such as an offsite/third party data warehouse.

The offsite location 118 includes one or more tracking device readers for reading or monitoring information stored on the storage medium of the tracking device 114 as the computer-readable media 110 arrive at or depart from the offsite location 118. In a further embodiment, a tracking event server or a second server 120 receives read information from the storage medium on the tracking device 114. For example, the tracking event server 120 may include instructions for periodically receiving data from the tracking device reader at the offsite 118 to monitor the progress and status of the computer-readable media 110. The tracking event server 120, in turn, forwards the read or received data from the tracking device reader to the data protection server 106 for processing. In an alternate embodiment, the tracking event server 120 may store or cache this information from the data protection server 106 locally and hence may not need to relay the information back to the data protection server. In one embodiment, the data protection server 106 and the tracking event server 120 may be in the same building, part of the same server, remote from each other, a component of or within each other, or a combination thereof.

As described above, the data protection server 106 writes or stores data on the removable computer-readable media 110. In an alternative embodiment, the data protection server 106 may also be responsible for at least one of the following tasks: backing up and recovering the data sources (e.g., from the cluster of servers 102), accepting protection intents (e.g., intent expression 112) as well as intents for media tracking/logistics, informing a user (e.g., an administrator) if the intent is compromised, and allowing the user to run an instantaneous check to see if the tracking/logistic intents are being met. Other operations and tasks may be added or assigned to the data protection server 106 without departing from the scope of the invention.

Figure 2:
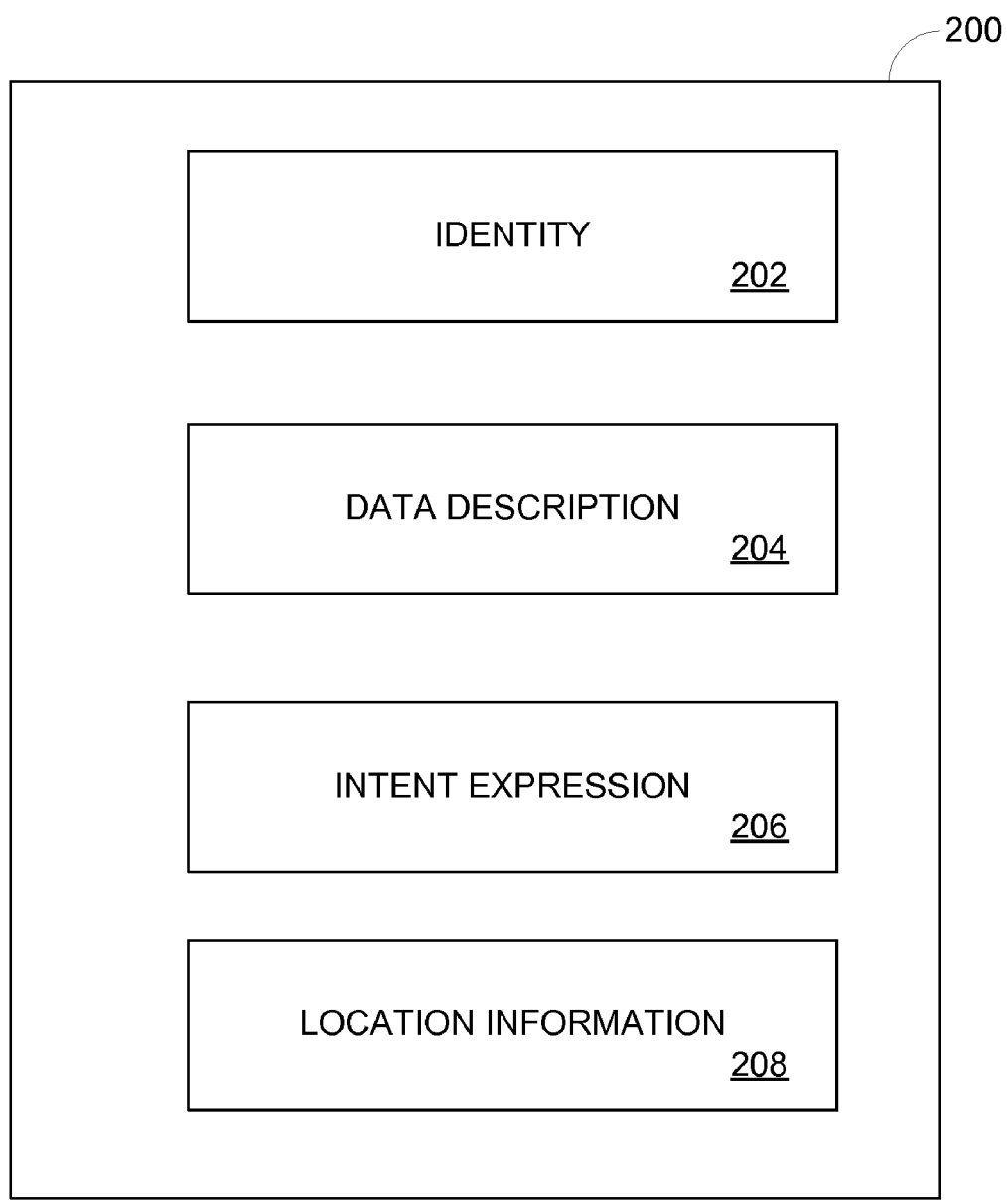
FIG. 2 is a block diagram illustrating a user interface for managing computer-readable media according to an embodiment of the invention.

Referring now to FIG. 2, a computer-readable medium (e.g., storage medium of the tracking device 114) having a data structure 200 for managing removable computer-readable media according to an embodiment of the invention. For example, the data structure 200 provides a structure for storing, among other things, the intent expression 112. The data structure 200 includes a first data field 202 storing information identifying the removable computer-readable medium (e.g., computer-readable media 110). In one illustration, the identifying information may be an identification number associated with the particular computer-readable medium. The data structure also includes a second data field 204 storing information describing data stored on the removable computer-readable medium identified in the first data field 202. For instance, the second data field 204 may include "Accounting: finance 1/20/2005 to 6/20/2005" as a description for the data stored on the computer-readable medium. It is also to be understood that the format of the description or the identification information may be in various form without departing from the scope of the invention.

The data structure 200 includes a third data field 206 storing information defining an intent expression (e.g., intent expression 112). The intent expression includes a condition for managing, including tracking and handling, the data stored on the removable computer-readable medium transported across the various locations. For example, the intent expression can be processed by a computer or a computing device as an executable expression or markup-based language. In one embodiment, the intent expression includes attributes and expresses executable statements or conditions for managing the data stored on the removable computer-readable medium. The following illustrates one or more exemplary intent attributes and intent expressions that may be stored on the third data field 206 of the data structure 200 on a storage medium of a tracking device:

| Intent attributes | Description |
| --- | --- |
| Touch point | This is an identification for the touch point |
| ETA at touch point | This is the expected time of arrival at a touch point (this time is relative to the time of the backup or time elapsed since media left the premises of the previous touch point) |
| Duration to stay at touch point | This is the duration a removable media is expected to stay at a touch point |
| Action required at the touch point | Any action defined to be performed at each touch point. |

The example above describes four attributes: "Touch Point," "Expected Time of Arrival" (ETA) at Touch Point," "Duration to stay at Touch Point," and "Actions required at the touch point." Based on the attributes' definitions, a user 122, such as an administrator managing the data protection server 106, may define intent expressions below:

<Touch point=Local vault, ETA=+2 hours, Duration
to stay at touch point=2 weeks, Action required
at the touch point=Alert user>;  Expression 1

<Touch point=Remote office vault, ETA=+2 hours,
Duration to stay at touch point=4 weeks, Action
required at the touch point=Alert user>;  Expression 2

<Touch point=Iron mountain vault, ETA=+24 hours,
Duration to stay at touch point=12 months,
Action required at the touch point=Destroy
media>  Expression 3

In one instance, the exemplary intent expressions above illustrate that the user 122 expects the removable computer-readable media to follow a defined path and within a defined time. Hence, as per the intent of the user 122, the data protection server 106 will provide a prompt when the backup data to the computer-readable medium is complete and ask that the computer-readable medium be removed. Once the computer-readable medium is removed, it is expected to be taken to the onsite vault within 2 hours. If the media does not reach the onsite vault 2 hours after it has left the source location (as reported by the touch point at the onsite vault) then the data protection server 106 may issue or raise an alert to indicate this to the user 122. In another embodiment, the user 122 may be software, software programs, applications, executable components or the like that is capable of issuing instructions to the data protection server 106 to create or define the intent expression 112.

Based on the choice of the user 122 or the configuration of the data protection server 106, the data protection server 106 may take a variety of measures under "Action required at the touch point" intent to design or define any customized action, such as, marking the media suspect (and warning on any future use of this media), expiring the media (destroying relevant keys if the media is encrypted), or other (conditional) actions for managing the data on the computer-readable media 110.

In a further alternative embodiment, if the computer-readable media 110 is moved out of the intended location within the specified duration, the data protection server 106 will alert the user 122 and appropriate action can be taken.

In an alternative embodiment, the user 122 may instruct the data protection server 106 to change or modify the intent expression 112. As such, the data protection server 106 communicates with the tracking event server 120, updates the intent expression 112 of the affected computer-readable media 110 and receives a confirmation that the modification has completed. In a further alternative embodiment, the user 122 may instruct an administrator at the offsite location 118 to update the intent expression 112 at the offsite location 118 in the event that there is a connection problem with the data protection server 106, the tracking event server 120, and/or the computer-readable media 110. The confirmation to the user 122 may also indicate that, due to the change or modification of the intent expression 112, the modified intent expression creates a conflict with the original intent expression. For example, suppose the original intent expression indicates that a removable computer-readable medium is at an offsite location A. The user 122 later modifies it to define the intent expression as indicating that the removable computer-readable medium should be at an offsite location B. As such, the confirmation will flag or alert the user 122 as a result of the modification. In an alternative embodiment, a conflict check may be performed of a proposed intent expression change with the original intent expression before the data protection server 106 communicates with the tracking event server 120.

Referring back to FIG. 2, the data structure 200 further includes a fourth data field 208 for storing location information. For example, the fourth data field 208 may include a location identification associated with a location, an address or address identifier, information about the administrator at the location, or the like. Based on the location information and the location intent in the intent expression 112, embodiments of the invention enable distributed media management. For example, in one embodiment, the data protection server 106 will persist intent information on the tracking device 114 that is associated with the removable computer-readable media. This enables a distributed management of media thereby greatly reducing the costs associated with the physical transfer of media for operations.

In another example of the intent expression 112, the intent may be defined as a collection of the values in the table below:

| Intent attributes | Description |
| --- | --- |
| Retention period | This identifies the retention period for the data on this media |
| Expiry action | This defines what action to perform upon expiry of the media. Possible actions (not limited to) are destroy media, return to owner |
| Duration within which expiry action is executed | This is the duration within which the expiry action must be executed |

Since these intents are stored on the removable computer-readable media 110 and are in a form that can be read by the tracking device reader and processed locally at the offsite location 118, actions can be taken at the remote site itself to manage the media.

For example, if the intent expression is defined as below:

<Retention period=12 months (starting from mm/dd/
yyyy), expiry action=destroy media, duration for
expiry action=expiry date+7 days>.  Expression 1

In this case, the tracking device readers at the offsite location 118-1 can be used to read the intent and these can be processed and acted upon at the offsite location 118-1. Based on the above intent, the computer-readable media is to be destroyed. After 7 days, the data protection server 106 may poll or request the appropriate touch point (i.e., offsite location 118) to ensure that the computer-readable media is not detectable (this assumes that the tracking device 114 as well as the computer-readable media are physically destroyed). If the intent is not met (i.e. the computer-readable media is not destroyed), then data protection server 106 will alert the user 122 and take appropriate action.

As in the earlier case, data protection server 106 will be able to update the intent on the media if the administrator chooses to change this intent.

Embodiments of the invention may also be used to perform auditing or inventory of computer-readable media 110. For example, since the data protection server 106 is able to provide an intent driven approach to track and manage computer-readable media, it is also essential that the data protection server 106 supports audit and inventory of these media on an on-demand or scheduled basis.

To enable this, the data protection server 106 will provide a mechanism for the administrator to run an immediate 'track and locate' scan via the tracking event server 120 on all computer-readable media 110 at the offsite locations 118. The result of this will be a list of all computer-readable media along with a status on whether the location intents are being adhered to.

In a further application of embodiments of the invention, optimized logistics based on intent expression may be accomplished. For example, the data protection server 106 may define an intent expression that states a "recall probability" intent expression from the administrator and persist this on the storage medium of the tracking device 114. The intent may be modeled as below:

| Intent attributes | Description |
| --- | --- |
| Recall Probability | This identifies the likelihood of the media getting recalled |

Based on this intent, the offsite location 118 has the flexibility to store the media appropriately. For example, if the recall probability is high, the computer-readable media may be stored in the most accessible warehouse and in the most accessible vaults. This may lead to a higher charge back to the customer (i.e., the administrator performing the backup in this case). If the recall probability is low, then the media will be stored in lesser accessible warehouses (potentially leading to a longer turn around time for recovery or retrieval) and this may cost less for the customer.

In a further embodiment, the data protection server 106 may also monitor the number of times a computer-readable media 110 has been recalled and may be able to appropriately increase and modify this probability value if the number of recalls is above the average or a pre-determined level for a computer-readable media. Based on the changes to this value, an administrator or a user under a similar role/persona that has the proper privilege or rights to modify the information at the offsite location 118 may modify their storage logistics and appropriately charge the customer.

It is to be understood that during the communications between the data protection server 106, the tracking event server 120, and/or the tracking device reader, the intent expression 112 is communicated using a protocol or transmission format that is common among the three entities such that the intent expression 112 may be properly consumed or processed accordingly at each entity. It is also understood that protocol converting mechanisms may be employed to enable smooth communications between these entities.

Figure 3:
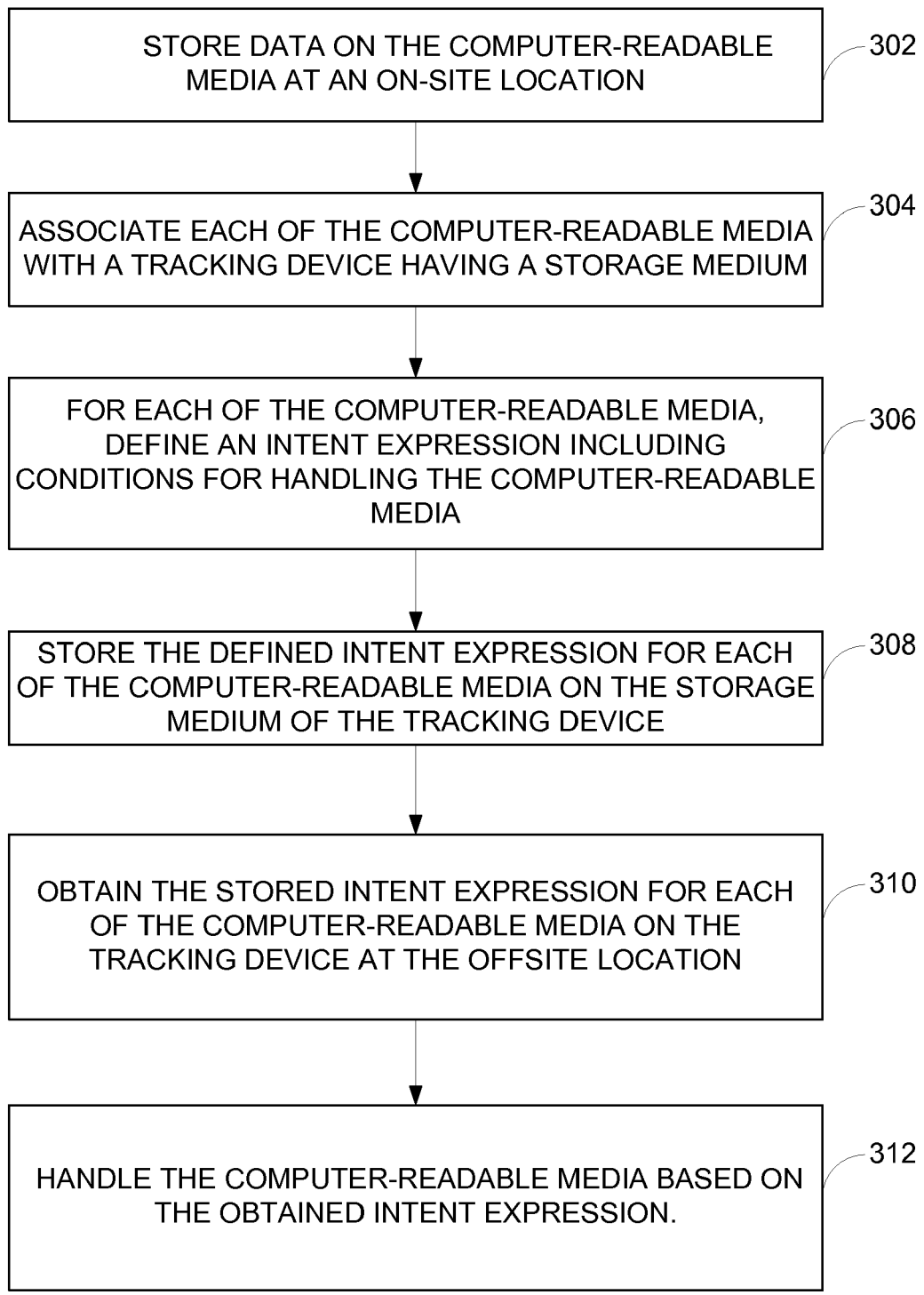
FIG. 3 is an exemplary flow chart illustrating operation of managing computer-readable media according to an embodiment of the invention.

Referring now to FIG. 3, an exemplary flow chart illustrates operation of managing computer-readable media according to an embodiment of the invention. For example, at 302, data is stored on computer-readable media at an on-site location. Each of the computer-readable media is associated with a tracking device. The tracking device has a storage medium at 304. At 306, an intent expression is defined for each of the computer-readable media. The defined intent expression includes conditions, expressions, attributes, and/or attribute values for managing each of the computer-readable media. The defined intent expression for each of the computer-readable media is stored on the storage medium of the tracking device at 308. The computer-readable media are transported from the on-site location (e.g., onsite location 116) to an offsite location (e.g., offsite location 118). The stored intent expression for each of the computer-readable media is on the tracking device is obtained at the offsite location to manage the computer-readable media based on the defined intent expression at 310.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for managing removable computer-readable storage media being transported across various locations, said method comprising:

storing data on a plurality of removable computer-readable storage media at an on-site location;

associating each of the removable computer-readable storage media with a particular tracking device, said tracking device having a storage medium;

defining a specific intent expression applicable to each of the removable computer-readable storage media, said defined specific intent expression including conditions for managing its applicable removable computer-readable storage media, said conditions including one or more intent attributes that define a movement path for its applicable removable computer-readable storage media across the various locations and one or more intent attributes that define a period of time to complete the movement path, wherein the defined specific intent expression applicable to one of the storage media is different than the defined specific intent expression applicable to another one of the storage media;

storing the defined specific intent expression for its applicable removable computer-readable storage media on the storage medium of the particular tracking device associated with its applicable removable computer-readable storage media;

wherein said removable computer-readable storage media and the associated tracking device including the defined specific intent expression applicable to said storage media are transported from the on-site location to an offsite location;

obtaining the defined specific intent expression for each of the removable computer-readable storage media from the storage medium of the associated tracking device at the offsite location; and managing the computer-readable storage media at the offsite location based on the obtained defined specific intent expression.

2. The method of claim 1, further comprising determining whether the included conditions of the obtained intent expression have been satisfied at the offsite location.

3. The method of claim 2, wherein determining comprises determining whether the included conditions of the obtained intent expression have been satisfied at the offsite location at a predetermined time interval.

4. The method of claim 2, further comprising issuing a notification to a user as a function of the determined condition.

5. The method of claim 2, wherein managing comprises modifying all or a portion of the obtained intent expression as a function of the determining.

6. The method of claim 2, wherein defining the intent expression further comprises defining the intent expression to include a condition describing at least one of the following: locations associated with removable computer-readable storage media, an expected time of arrival of the removable computer-readable storage media, duration of stay at each of the locations, a retention period of the stored data, an expiry action to be performed on the stored data, and a duration within which expiry action is to be executed, and a probability value for recalling the removable computer-readable storage media.

7. The method of claim 1, further comprising storing an identity, a data description and location information identifying one or more locations as a function of the intent expression for each of the computer-readable storage media on the tracking device.

8. The method of claim 1, wherein defining the intent expression comprises defining the intent expression to include a condition describing a probability value for recalling the removable computer-readable storage media.

9. The method of claim 1, wherein one or more computer-readable storage media have computer-executable instructions for performing the method of claim 1.

10. A tracking computer-readable storage medium not including a data signal having a data structure stored thereon for managing a removable computer-readable storage medium being transported across various locations, said data structure comprising:

a first data field storing information identifying the removable computer-readable storage medium;

a second data field storing information describing data stored on the removable computer-readable storage medium identified in the first data field;

readable storage media across the various locations and a defined period of time to complete the movement path, wherein the identified intent expression applicable to one of the storage media is different than the identified intent expression applicable to another one of the storage media and wherein the identified intent expression for each of the removable computer-readable storage media is obtained from the storage medium of the associated tracking device at the offsite location;

wherein the data structure comprises a defined specific intent expression, and wherein the defined specific intent expression is obtained from the tracking computer-readable storage medium at the various locations.

11. The computer-readable storage media of claim 10, further comprising a fourth data field for storing information identifying one or more locations as a function of the intent expression described in the third data field.

12. The computer-readable storage medium of claim 10, wherein the third data field storing information includes at least one of the following conditions in the intent expression: an expected time of arrival of the computer-readable storage media, duration of stay at each of the locations, a retention period of the stored data, an expiry action to be performed on the stored data, a duration within which expiry action is to be executed, and a probability value for recalling the computer-readable storage media.

13. The computer-readable storage medium of claim 10, wherein the third data field includes information defining the intent expression in one or more of the following forms: computer-executable instructions and markup-based language format.

14. A system for managing removable computer-readable storage media being transported across various locations, said system comprising:

a first server configured for storing backup data on a removable computer-readable storage medium;

a tracking device associated with the removable computer-readable storage medium, said tracking device having a storage medium having an intent expression stored on the storage medium, said intent expression including conditions for managing the backup data on the removable computer-readable storage medium, said conditions including one or more intent attributes that define a movement path for the removable computer-readable storage medium and a defined period of time to complete the movement path, wherein the intent expression applicable to one of the storage media is different than the intent expression applicable to another one of the storage media;

one or more location data readers for reading the intent expression on the storage medium of the tracking device associated with the removable computer-readable storage medium as the removable computer-readable storage medium and the associated tracking device are being transported across various locations wherein the intent expression for each of the removable computer-readable storage media is obtained from the storage medium of the associated tracking device at the offsite location;

a second server for processing the read intent expression; and a user interface for providing an event notification to a user in response to the processed intent expression.

15. The system of claim 14, wherein the second processor is further configured to determine whether the included conditions of the read intent expression have been satisfied at an offsite location.

16. The system of claim 15, wherein the second processor is configured to determine whether the included conditions of the read intent expression have been satisfied at the offsite location at a predetermined time interval.

17. The system of claim 16, wherein the user interface is further configured to issue a notification to the user as a function of the determined condition.

18. The system of claim 14, wherein the tracking device defines the intent expression to include a condition describing at least one of the following: locations associated with removable computer-readable storage media, an expected time of arrival of the removable computer-readable storage media, duration of stay at each of the locations, a retention period of the stored data, an expiry action to be performed on the stored data, a duration within which expiry action is to be executed, and a probability value for recalling the removable computer-readable storage media.

19. The system of claim 14, wherein the storage medium of the tracking device associated with each of the removable computer-readable storage media includes an identity, a data description and location information identifying one or more locations as a function of the intent expression for each of the removable computer-readable storage media associated with the tracking device.

20. The system of claim 14, wherein the second server is configured to process the read intent expression of the computer-readable storage medium on the tracking device at the offsite location in a periodic interval.

* * * * *